(12) United States Patent
Sparks

(10) Patent No.: US 9,269,147 B2
(45) Date of Patent: Feb. 23, 2016

(54) VISUAL SIGNATURE DETERMINATION SYSTEM FOR MOVING TARGETS

(71) Applicant: Bell Helicopter Textron Inc., Fort Worth, TX (US)

(72) Inventor: David Sparks, Fort Worth, TX (US)

(73) Assignee: Bell Helicopter Textron Inc., Ft. Worth, TX (US)

( * ) Notice: Subject to any disclaimer, the term of this patent is extended or adjusted under 35 U.S.C. 154(b) by 306 days.

(21) Appl. No.: 13/793,313

(22) Filed: Mar. 11, 2013

(65) Prior Publication Data

US 2014/0254868 A1 Sep. 11, 2014

(51) Int. Cl.
| | |
|---|---|
| G06K 9/00 | (2006.01) |
| G06T 7/00 | (2006.01) |
| G01S 3/786 | (2006.01) |
| G01S 7/48 | (2006.01) |

(52) U.S. Cl.
CPC .............. *G06T 7/004* (2013.01); *G01S 3/7864* (2013.01); *G01S 7/4802* (2013.01)

(58) Field of Classification Search
None
See application file for complete search history.

(56) References Cited

U.S. PATENT DOCUMENTS

| 5,389,790 A | 2/1995 | Honey et al. | |
|---|---|---|---|
| 2006/0115163 A1* | 6/2006 | Nagaoka et al. | 382/209 |
| 2011/0135154 A1* | 6/2011 | Wedge | G06T 7/2093 382/103 |
| 2011/0142284 A1 | 6/2011 | Shepherd et al. | |

FOREIGN PATENT DOCUMENTS

| RU | 2222209 C1 | 1/2004 |
|---|---|---|
| WO | 2009/134490 A1 | 11/2009 |
| WO | WO 2009134490 A1 * | 11/2009 |

OTHER PUBLICATIONS

Hrabar, Stefan. "3D Path Planning and Stereo-based Obstacle Avoidance for Rotorcraft UAV" IEEE, 978-1-4244-2058-2/08. 2008.*
ENV (NPL "Enhanced Night Visibility Series: Phase III—Characterization of Experimental Objects" vol. XVI, FHW-HRT-04-147, Dec. 2005).*
Official Action in related European Application No. 13171569.0, dated Oct. 11, 2013, 6 pages.
Official Action in related European Application No. 13171569.0, dated Mar. 20, 2014, 5 pages.
Search Report in related European Application No. 13171569.0, dated Sep. 19, 2013, 4 pages.
Krylov I S et al., "Visibility Meter," Soviet Journal of Optical Technology, American Institute of Physics, New York, NY, dated Sep. 1, 1992, 4 pages.

* cited by examiner

*Primary Examiner* — Bhavesh Mehta
*Assistant Examiner* — Oneal R Mistry
(74) *Attorney, Agent, or Firm* — Bell Helicopter Textron Inc.

(57) ABSTRACT

According to one embodiment, the visual signature of a moving target may be measured by measuring, using a photometer, an optical property of a moving target while the target moves along a path from a start position to an end position in front of a background. The photometer may be repositioned to measure optical properties of the background at the start position. The photometer may measure the optical property of the background along the path between the start position and the end position. The visual signature of the moving target may be determined by comparing the measured optical property of the moving target along the path to the measured optical property of the background along the path.

16 Claims, 3 Drawing Sheets

FIG. 3
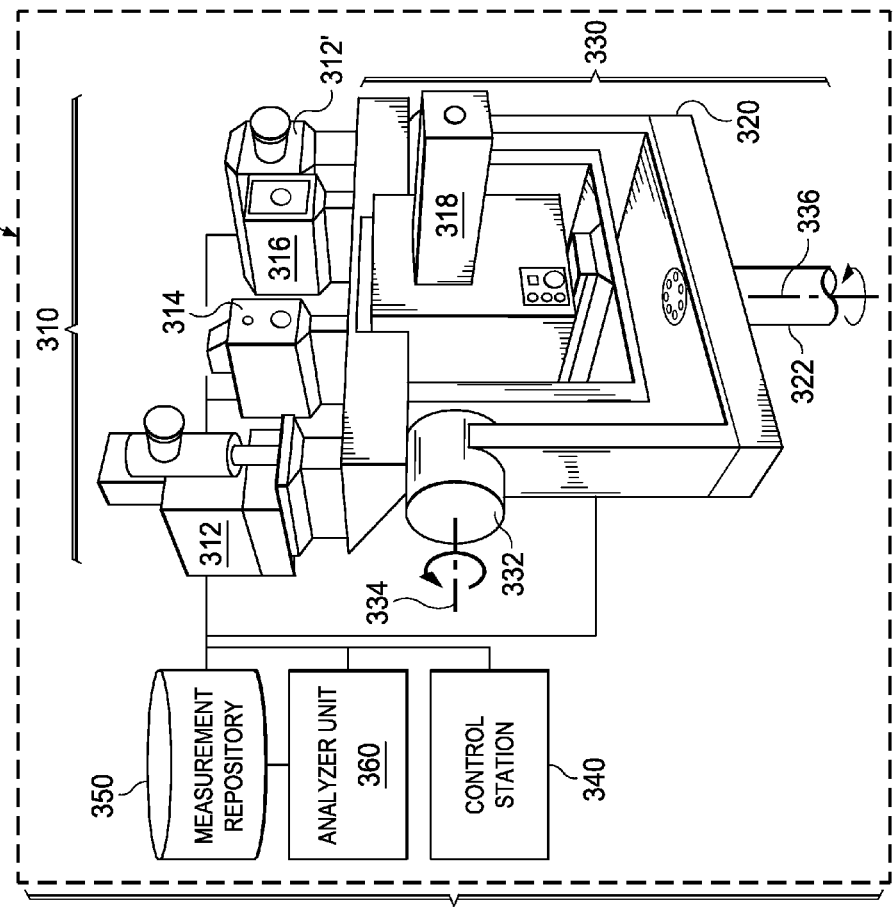
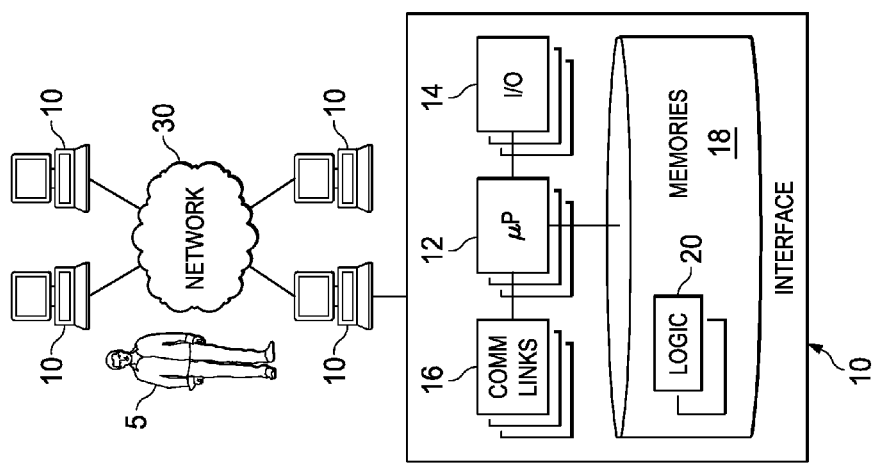

VISUAL SIGNATURE DETERMINATION SYSTEM FOR MOVING TARGETS

TECHNICAL FIELD

This invention relates generally to visual signatures, and more particularly, to a visual signature determination system for moving targets.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

Aircraft, such as a rotorcraft, may perform a variety of different missions. In some of these missions, the aircraft may fly over populated areas where people may be able to see the aircraft.

SUMMARY

Particular embodiments of the present disclosure may provide one or more technical advantages. A technical advantage of one embodiment may include the capability to more accurately identify the visual detectability of an aircraft. A technical advantage of one embodiment may also include the capability to measure the visual signature of an aircraft. A technical advantage of one embodiment may also include the capability to reduce the visual detectability of an aircraft.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 3 shows the visual signature determination system of FIG. 2 according to one example embodiment.

DETAILED DESCRIPTION OF THE DRAWINGS

Figure 1:
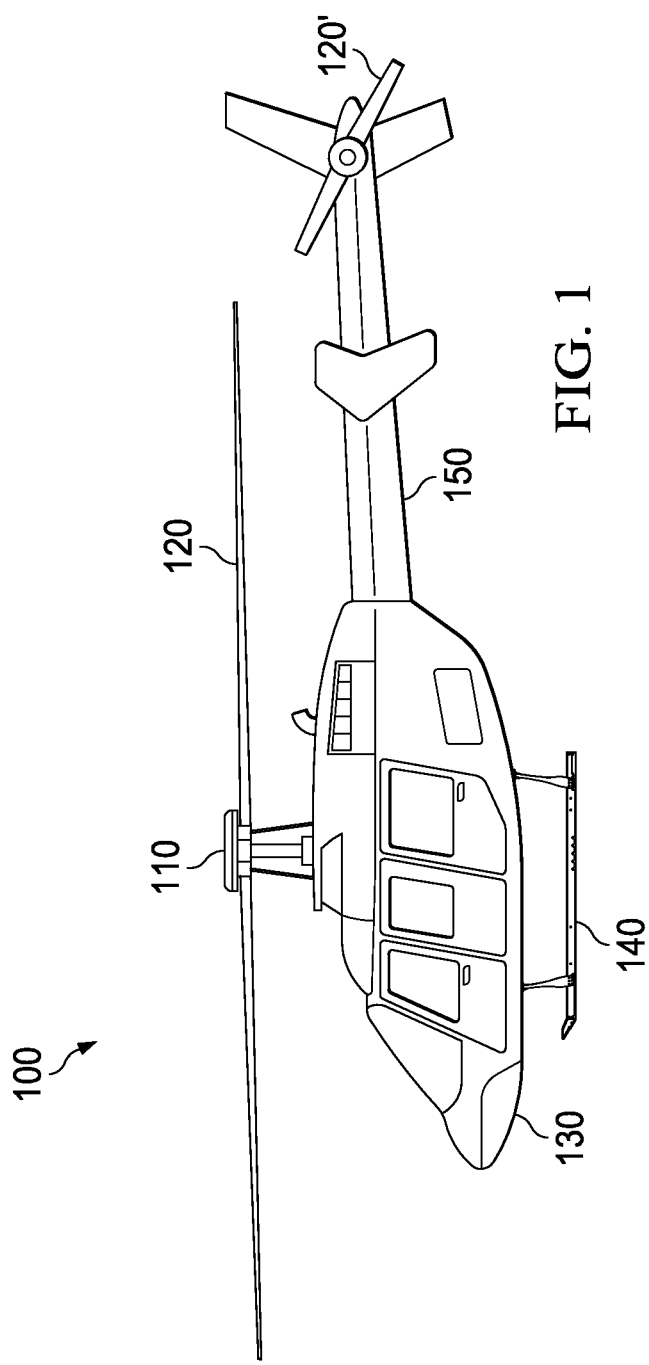
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft and vehicles other than rotorcraft, such as airplanes and unmanned aircraft, to name a few examples.

Aircraft such as rotorcraft 100 may perform a variety of different missions. In some of these missions, the aircraft may fly over populated areas where people may be able to see the aircraft. Some missions, however, may require that the aircraft avoid visual detection. Accordingly, teachings of certain embodiments recognize the capability to more accurately identify and analyze the visual signature of an aircraft.

The visual signature of an aircraft may generally describe the visual detectability of the aircraft. A visual signature may depend on many factors, including the shape and size of the aircraft, the color of the aircraft, the brightness of the aircraft, distance from the viewer, and the background against which the aircraft is viewed. Although a visual signature may primarily address optical properties in the visual-light spectrum (e.g., electromagnetic radiation with an approximate wavelength between 380 nanometers and 760 nanometers), the visual signature may also address optical properties outside the visual-light spectrum, such as in the ultraviolet-light spectrum (e.g., electromagnetic radiation with an approximate wavelength between 10 nanometers and 400 nanometers).

Teachings of certain embodiments recognize that the visual signature may have greater importance that previously recognized. For example, military aircraft may be designed to avoid radar or infrared detection. Such design techniques often require tremendous resources (e.g., numerous man-hours, expensive equipment) and performance of complicated calculations. In these design processes, the visual signature may be more of an afterthought and may have little impact on the design process other than selection of a primary paint color.

Teachings of certain embodiments recognize, however, that the visual signature of an aircraft may be studied for a variety of important reasons. For example, the visual signature of an aircraft may be studied to understand the likely visual signature of certain threats so that those threats may be detected (e.g., manually or using equipment designed to detect threats). As another example, the visual signature of an aircraft may be studied to analyze the visual signature of one's own assets. For example, an aircraft may be designed to have a visual signature below the detection capability of humans on the ground. Alternatively, some aircraft may be designed to be highly detectable to humans on the ground (e.g., search and rescue rotorcraft).

Although aircraft detectability may be roughly characterized using human data (e.g., using an "eye ball" test), teachings of certain embodiments recognize that the visual signature of an aircraft may be more accurately described by using more accurate measurement data than is available from a human eye-witness. Accurate characterization of an aircraft's visual signature, however, may present major measurement challenges. For example, visual signature measurement results may be very noisy and irreproducible.

As will be explained in greater detail below, a visual signature may be expressed as a contrast quality. For example, a visual signature of an aircraft may be determined from two measurements: (1) that of the aircraft, which may be referred to as the target measurement; and (2) that of the aircraft's surroundings, which may be referred to as background measurement. The visual signature of the aircraft may be expressed as a difference between these two measurements. In this example, accuracy of both the target measurement and the background measurement can introduce uncertainty into the visual signature calculations. Accordingly, improving accuracy of these two measurements may improve accuracy of the characterization of the visual signature.

In the previous example, a visual signature may be determined by measuring an optical property of both the target and the background. An optical property may refer to measurable property indicative of visual detectability of a target (such as an aircraft). In some embodiments, the optical property may be one of a variety of measured properties within the field of photometry. Photometry generally refers to the science of the measurement of light in terms of its perceived brightness to the human eye. Characteristics of photometry may include, but are not limited to, brightness, luminous flux, luminous intensity, and luminous emittance. The optical property is not limited to properties of visible light. For example, the optical property may include properties of light within the ultraviolet-light spectrum.

One example of an optical property is luminance. Luminance may represent a quantitative measure of how much light illuminates a surface. Teachings of certain embodiments recognize that the difference in luminance between a target and the background behind the target may be indicative of the visual detectability of the target. Other examples of an optical property may include photometric and non-photometric properties, including, but not limited to, irradiance, light absorption, light scattering, light reflection, fluorescence, phosphorescence, and luminescence.

Figure 2:
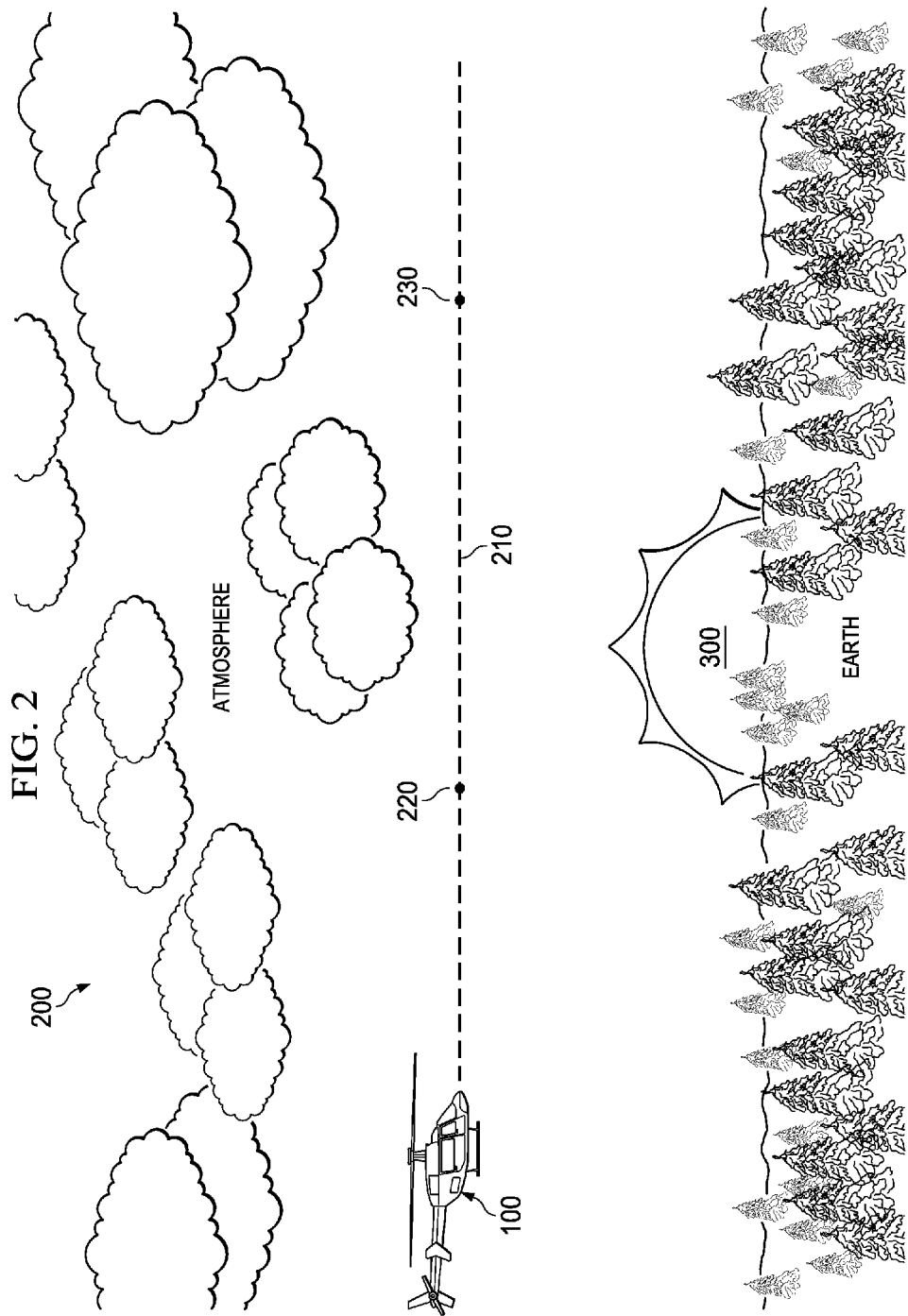
FIG. 2 shows an environment for measuring the optical properties of the rotorcraft of FIG. 1 and its surroundings.

FIG. 2 shows an environment 200 for measuring the optical properties of a moving target (e.g., rotorcraft) and the background (e.g., the atmosphere) according to one example embodiment. In the example of FIG. 2, rotorcraft 100 flies along a flight path 210 that includes a start position 220 and an end position 230. A visual signature determination system 300 is positioned on the ground and is equipped with a photometer for collecting measurements associated with the visual signature of rotorcraft 100 as rotorcraft 100 files from start position 220 to end position 230. A photometer is an instrument operable to measure optical properties of a target or background. Visual signature determination system 300 (and its photometer) will be described in greater detail with regard to FIG. 3.

In operation, according to one example embodiment, visual signature determination system 300 measures, using its photometer, an optical property of rotorcraft 100 while rotorcraft 100 moves along flight path 210 from start position 220 to end position 230. Visual signature determination system 300 then repositions the photometer to measure optical properties of the atmosphere at start position 220. For example, visual signature determination system 300 may aim the photometer at the start position such that the photometer may perform measurements of the background now that rotorcraft 100 is no longer at start position 220. Next, visual signature determination system 300 measures, using its photometer, the optical property of the background along flight path 210 from start position 220 to end position 230. Finally, the visual signature of rotorcraft 100 may be determined by comparing the measured optical property of rotorcraft 100 along flight path 210 to the measured optical property of the background (the atmosphere) along flight path 210.

Measurements of optical properties may be performed either continuously or at discrete locations. For example, in some embodiments, the photometer may measure the optical property of rotorcraft 100 at desired trigger points while rotorcraft moves along flight path 210 from start position 220 to end position 230. These measurements may then be recorded for each desired trigger point as a function of time. Visual signature determination system 300 may then reposition the photometer to start position 220 and measure the optical property at the previously-defined trigger points along flight path 210 from start position 220 to end position 230. The trigger points may be spaced at any suitable intervals. For example, more trigger points may be provided at smaller intervals to provide more measurement samples. In some embodiments, the trigger points may be spaced at irregular intervals so as to concentrate the measurement samples at certain locations.

FIG. 3 shows the visual signature determination system 300 of FIG. 2 according to one example embodiment. Visual signature determination system 300 features a tracker assembly 310, a pan-and-tilt tracker platform 320, an actuator system 330, a control system 340, a measurement repository 350, and an analyzer unit 360. Visual signature determination system 300 may be implemented in whole or in part by one or more computers 10 that may be accessed by a user 5.

Users 5 may include any individual, group of individuals, entity, machine, and/or mechanism that interacts with computer systems 10. Examples of users 5 include, but are not limited to, a service person, pilot, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

In the example of FIG. 3, visual signature determination system 300 features a tracker assembly 310, a pan-and-tilt tracker platform 320, an actuator system 330, a measure repository 340, and an analyzer unit 350. In operation, tracker platform 320 may enable tracker assembly 310 to track a moving object (such as an aircraft) along a path (such as along a flight path). Tracker platform 320 is pivotally coupled to a ground base (not shown) via a shaft 322. Actuator system 330 is operably associated with the ground base for rotating shaft 322, tracker platform 320, and tracker assembly 310 about axes 334 and 334. Actuator system 330 may include one or motors 332 and other components for precisely and accurately moving tracker platform 320 and tracker assembly 310 in response to selected inputs.

Embodiments of tracker assembly 310 include various video, and laser sensors, such as a visual-band photometer 312, an ultraviolet-band photometer 312', a rangefinder 314, a video camera 316, and a spectrometer 318. Visual-band photometer 312 and ultraviolet-band photometer 312' may measure optical properties of a target or background in the visual-light and ultraviolet-light optical bands. Rangefinder 314 may measure a distance between system 300 and the target. Spectrometer 318 may measure properties of light over a specific spectrum. Spectrometer 318 may measure optical properties such as light intensity and polarization state. In some embodiments, all or some of these components may allow system 300 to track the path of a target as well as provide measurements of optical properties of the target and the background.

In some embodiments, system 300 may include a control station 340 for controlling various operations of system 300. Control station 340 may be connected to system 300 via a wired or wireless communications network for receiving and transmitting data. The control station 340 may be remotely located from other components in system 300, such as in a separate building, trailer, or similar structure. In some embodiments, the remote control station 360 may be a portable computing device, such as a laptop computer, personal digital assistant, cell phone, or any other suitable computing device.

In operation, according to one example embodiment, system 300 records and repeats its motions. This feature may allow system 300 to take measurements on a moving target, such as an aircraft, and store these measurements in measurement repository 350.

For the target measurement, the moving target (e.g., the aircraft) may be tracked, either automatically or manually, via at least one display device for displaying live video signals from at least one camera or photometer, such as visual-band photometer 312, ultraviolet-band photometer 312', and/or video camera 316. This may be done, for example, by a user 5 placing and keeping crosshairs on the aircraft as the aircraft moves through a target zone. Visual-band photometer 312, ultraviolet-band photometer 312', and/or video camera 316 may be mounted on tracker assembly 310, and the display device may be located with control station 340, which may be remote from tracker assembly 310.

The motions of tracker assembly 310 may be recorded from a "start" position to an "end" position, which may correspond to the start position 220 and end position 230 of rotorcraft 100 in FIG. 2. While the target is in the crosshairs, control unit 340 may selectively trigger the sensors to record target optical property data, either automatically or in response to input from user 5. The trigger signals may switch the sensors between an "on" mode, an "off" mode, or other modes. As the target data is recorded, a time-log file may be generated that records the motions of tracker assembly 310, along with the status of the trigger signal (e.g., whether the sensors are in the "on" mode. the "off" mode, or any other mode). At the completion of the target measurement phase of operation (which in some examples may last a few seconds in duration), user 5 may command the sensors to stop recording data and close the log file. The optical property data and the time-log file may be stored in measurement repository 350.

Next, system 300 may retrace the aircraft's flight path to accurately measure the optical properties of the actual background and then store these measurements in measurement repository 350. For example, after the target has flown out of the sensors' fields of view and the target measurements have been recorded, user 5 may command tracker assembly 310 to return to the "start" position, repeat the tracker movements, and resend the trigger signals based on the previously generated log file. This procedure is referred to herein as "digital tracker playback." Teachings of certain embodiments recognize that procedures such as digital tracker playback may allow system 300 to record and repeat its motions. During digital tracker playback, the optical property data of the background is measured without the moving target being present. In this example, digital tracker playback may provide a set of time-dependent background data that contrasts with the time-depending target data previously recorded.

In another example embodiment, system 300 may record the background optical property data while the tracker assembly retraces its motions in reverse from the "end" position to the "start" position.

By measuring the optical properties of the actual background along the path of the aircraft, analyzer unit 360 may accurately determine the visual signature of the target based on the stored target measurements and background measurements. In addition, gathering accurate measurements and analyzing the visual signature of the target based on these measurements may allow analyzer unit 360 to identify low-magnitude visual signatures. For example, some embodiments may identify visual signatures that many human eyes may miss.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A method for measuring a visual signature of a moving target, comprising:
   measuring, using a visual-band photometer, an optical property of a moving target while the target moves along a path from a start position to an end position in front of a background, wherein the optical property of the moving target is an optical property in the visual-light band, wherein measuring the optical property of the moving target while the target moves along the path from the start position to the end position in front of the background comprises:
   measuring the optical property of the moving target at desired trigger points while the target moves along the path from the start position to the end position in front of the background; and
   recording the measurements at the desired trigger points as a function of time;
   repositioning the visual-band photometer to measure optical properties of the background at the start position;
   measuring, using the visual-band photometer, the optical property of the background along the path between the start position and the end position, wherein the optical property of the background is an optical property in the visual-light band; and
   determining the visual signature of the moving target by comparing the measured optical property of the moving target along the path to the measured optical property of the background along the path.

2. The method of claim 1, wherein the moving target is an aircraft in flight.

3. The method of claim 1, wherein the background is at least a portion of the earth's atmosphere.

4. The method of claim 1, wherein the optical property is selected from the group consisting of: luminance, irradiance, light absorption, light scattering, light reflection, fluorescence, phosphorescence, and luminescence.

5. The method of Claim 1, wherein measuring the optical property of the background along the path between the start position and the end position comprises measuring the optical property of the background at the previously-defined desired trigger points.

6. The method of claim 5, wherein measuring the optical property of the background along the path between the start position and the end position comprises measuring the optical property of the background in order from the end position to the start position.

7. The method of claim 1, wherein measuring the optical property of the moving target while the target moves along the path from the start position to the end position in front of the background comprises:
   providing a movable tracker platform;
   operably associating a tracker assembly with the tracker platform for tracking the moving target;
   tracking the path of the moving target with the tracker assembly by moving the tracker platform;
   recording, as a function of time, the movements of the tracker platform as the tracker assembly tracks the moving target from the start position to the end position;
   operably associating the visual-band photometer with the tracker assembly for obtaining optical property measurements; and
   triggering the visual-band photometer to measure the optical property of the moving target while the target moves along the path from the start position to the end position in front of the background.

8. The method of claim 7, wherein the tracker platform is a pan-and-tilt platform capable of at least two axes of rotation.

9. The method of claim 8, wherein repositioning the visual-band photometer to measure optical properties of the background at the start position comprises repositioning the pan-and-tilt tracker platform such that the visual-band photometer is positioned to measure optical properties of the background at the start position.

10. The method of claim 9, wherein measuring the optical property of the background along the path between the start position and the end position comprises retracing the movements of the pan-and-tilt platform from the tracking step.

11. A visual signature determination system comprising:
a visual-band photometer operable to:
  measure an optical property of a moving target while the target moves along a path from a start position to an end position in front of a background, wherein the optical property of the moving target is an optical property in the visual-light band, wherein the visual-band photometer is operable to measure the optical property of the moving target while the target moves along the path from the start position to the end position in front of the background by measuring the optical property of the moving target at desired trigger points while the target moves along the path from the start position to the end position in front of the background and recording the measurements at the desired trigger points as a function of time, and
  measure the optical property of the background along the path between the start position and the end position, wherein the optical property of the background is an optical property in the visual-light band;
a tracker system operable to reposition, in response to measuring the optical property of the moving target while the target moves along the path, the visual-band photometer to measure optical properties of the background at the start position; and
an optical property analyzer operable to determine the visual signature of the moving target by comparing the measured optical property of the moving target along the path to the measured optical property of the background along the path.

12. The system of claim 11, wherein the optical property is a photometric property.

13. The system of claim 11, wherein the optical property is selected from the group consisting of: luminance, irradiance, light absorption, light scattering, light reflection, fluorescence, phosphorescence, and luminescence.

14. The system of claim 11, wherein the visual-band photometer is operable to measure the optical property of the background along the path between the start position and the end position by measuring the optical property of the background at the previously-defined desired trigger points.

15. The system of claim 11, the tracker system comprising:
a tracker platform;
a tracker assembly operably associated with the tracker platform for tracking the moving target;
an actuator system for moving the tracker platform, so as to track the path of the moving target with the tracker assembly; and
a control station for recording the movements between a start position and an end position.

16. The system of claim 15, wherein the tracker platform is a pan-and-tilt platform capable of at least two axes of rotation.

* * * * *